United States Patent [19]

Duranel et al.

[11] Patent Number: 4,851,208

[45] Date of Patent: Jul. 25, 1989

[54] PROCESS FOR THE MANUFACTURE OF SPHERICAL PARTICLES OF METAL COMPOUNDS OF GROUP II OF THE PERIODIC TABLE

[75] Inventors: Laurent Duranel; Nadine Sanchez, both of Pau, France

[73] Assignee: Atochem, France

[21] Appl. No.: 888,236

[22] Filed: Jul. 21, 1986

[30] Foreign Application Priority Data

Aug. 13, 1985 [FR] France ................. 85 12340

[51] Int. Cl.[4] ................ C01F 5/14; C01F 5/30; C01F 11/02; C01F 11/20

[52] U.S. Cl. .................... 423/490; 23/304; 423/497; 423/498; 423/636; 502/8; 502/9; 568/851

[58] Field of Search .......... 423/490, 497, 498, 635, 423/636; 568/851; 23/304, 293 S; 502/8, 9

[56] References Cited

U.S. PATENT DOCUMENTS

| | | | |
|---|---|---|---|
| 2,552,314 | 5/1951 | Gloss | 423/635 |
| 2,944,986 | 7/1960 | Powell et al. | 502/9 |
| 2,996,356 | 8/1961 | Pennington et al. | 423/498 |
| 3,348,908 | 10/1967 | Long et al. | 423/498 |
| 3,419,347 | 12/1968 | Weissenberg | 423/498 |
| 3,440,006 | 4/1969 | Weissenberg | 423/498 |

FOREIGN PATENT DOCUMENTS

65707  4/1983  Japan .

OTHER PUBLICATIONS

The Merck Index, 8th ed., Stecher et al, eds. Merck & Co., Inc. 1968, p. 685.
CRC Handbook of Chemistry and Physics, 62nd ed., West et al, eds. CRC Press, 1982, p. B-116.

Primary Examiner—John Doll
Assistant Examiner—Jeffrey Edwin Russel
Attorney, Agent, or Firm—Sigalos, Levine & Montgomery

[57] ABSTRACT

A process for the manufacture of substantially spherical particles of at least one metal compound of Group II of the Periodic Table, comprising dissolving such compound in a solvent therefor to form a solution and introducing the solution into a non-solvent medium; said non-solvent medium consisting essentially of at least two liquids that are non-solvents for said compound, at least one of said non-solvents being immiscible with the solvent solution and at least one of said non-solvents being miscible with said solvent solution.

7 Claims, 3 Drawing Sheets

PROCESS FOR THE MANUFACTURE OF SPHERICAL PARTICLES OF METAL COMPOUNDS OF GROUP II OF THE PERIODIC TABLE

BACKGROUND OF THE INVENTION

The present invention concerns a process for the manufacture of substantially spherical or spherodical particles; i.e., particles whose shape approaches that of a sphere, of metal compounds of Group II of the Periodic Table, by preciptation in a non-solvent medium of the compound in solution in a solvent.

From Japanese Patent Application 81JP164106 it is known to put a magnesium halide into solution and to precipitate it in a non-solvent organic medium. There one is dealing with a standard means of precipitation resulting in only powdered products without special shape.

Metallic compounds, particularly metal compounds of Group II of the Periodic Table, of spherical morphology are becoming increasingly sought after. These spherical compounds find their principal application as catalyst supports. In the case of, for instance, Ziegler catalysis, it is known to employ metallic salts such as $MgCl_2$ as supports for transition metal salts active in polymerization or copolymerization of olefins. In this latter application, the morphology of the present supports is widely varied, haphazard, and uncontrolled, which is unfavorable for obtaining a high apparent density and good flowability of the polymer obtained after synthesis. It is known that these properties are clearly improved when the polymer possesses a spherical morphology resulting from a spherical morphology of the catalyst or of its support.

It is thus that according to European Patent Application 83074 a way of obtaining this morphology under the appearance of small liquid balls is described. According to this patent application, an emulsion of a compound based on magnesium and titanium is prepared in the presence of a surfactant in inert medium under very strong agitation. This technique presents the double drawback of leading to a liquid catalytic system and of excluding the possibility of fabricating a pure support likely to be used for different catalytic purposes and under different conditions.

SUMMARY OF THE INVENTION

According to the present invention, it is possible to prepare particles of metal compounds of Group II of the Periodic Table which are practically spherical and solid by controlled precipitations and capable of being used, amongst other things, as catalytic supports of the Ziegler type.

The present invention comprises a process for the manufacture of substantially spherical particles of at least one metal compound of Group II of the Periodic Table, comprising dissolving such compound in a solvent therefor to form a solution and introducing the solution into a non-solvent medium; said non-solvent medium consisting essentially of at least two liquids that are non-solvents for said compound, at least one of said non-solvents being immiscible with the solvent solution and at least one of said nonsolvents being miscible with said solvent solution.

DETAILED DESCRIPTION

Figure 1:
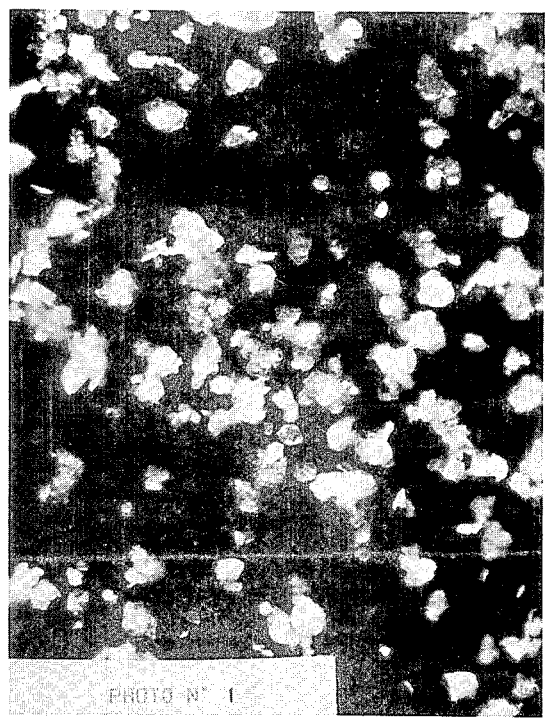
FIG. 1 is a copy of a photomicrograph of the particles (magnified 80 times) formed by the process of Example 1.

The compounds based on a metal of Group II of the Periodic Table must be soluble in at least one solvent, they customarily correspond to the following general formula:

$$M_e X_n (OR)_{2-n}$$

in which:

$M_e$ is a metal selected from Group II of the Periodic Table, with magnesium being particularly recommended when it is desired to prepare catalytic supports of the Ziegler type;

R is hydrogen or a linear, branched or possibly cylindrical, saturated or unsaturated, possibly aromatic hydrocarbon radical; which radical can furthermore possess one or several heteroatoms such as halogens, oxygen, nitrogen, sulfur or phosphorus; and $0 < n < 2$.

It is of course not excluded, in view of a coprecipitation, to initially dissolve several metallic compounds of the same metal or of different metals of Group II.

As previously stated, the metal compound is dissolved in a solvent. Defined as solvents are organic products capable of dissolving the metal compound. It is, however, recommended to use a solvent in which the solubility of the metal compound is great. In order to increase the solubility of the compound in the solvent, it is possible to use solutions at a temperature above the ambient temperature. In the particular case of magnesium chloride, given as an example, it is recommended to use a solvent in which the salt is miscible at more than 5% by weight at ambient temperature. Water, dimethylformamide, ethanol, methanol, and mixtures thereof can be cited among the recommended solvents.

To the extent that one of the two non-solvent liquids utilized subsequently to the precipitation of the metal compound is immiscible with the solvent medium, it is possible to use a mixture of solvents as the solution medium.

The metal compound dissolved in the solvent is precipitated in the non-solvent medium. Generally speaking, the solution is poured into the non-solvent medium with agitation. Preferably, the solution is introduced dropwise into the nonsolvent medium kept under moderate agitation. The mean diameter of the final particles principally depends on the size of the drops.

In order to obtain substantially spherical precipitated particles, the non-solvent medium must necessarily be composed of at least two liquids characterized by their properties with respect to the solvent medium of the metal compound of Group II. At least one of these liquids must be miscible with the solvent medium and at least one of them must be immiscible with the same medium. The value of the ratio between miscible liquids and immiscible liquids is selected in such a way that, on one hand, precipitation can take place and that, on the other hand, it is sufficiently slow to favor the formation of spherical particles. These two conditions are easily determined by one skilled in this art by some routine tests, as a function of the nature of the liquids and of the solvent medium as well as of the metal compound of Group II, which are selected. Customarily, a volume ratio of miscible liquid to immiscible liquid between 0.1 and 200 and preferably between 0.5 and 200 permits obtaining satisfactory results. Depending on the solvents used, we can, for instance, envisage as the nonsolvent medium mixtures of dioxane or of acetone with a hydrocarbon or methylene chloride or even of a hydrocarbon and of methylene chloride, when the latter is immiscible with the solvent medium.

As an example and in nonlimiting manner, in the case of magnesium chloride we can cite: water, methanol, ethanol or dimethylformamide as the solvent, with on one hand as the non-solvent medium (in the case in which the solvent is water) a mixture of dioxane or of acetone as the miscible liquid with a hydrocarbon or methylene chloride as the immiscible liquid, or on the other hand as the nonsolvent medium (in the case in which the solvent is methanol or dimethylformamide) a mixture of dioxane or of methylene chloride as the miscible liquid with a hydrocarbon as the immiscible liquid.

The appreciably spherical particles precipitated are recovered from the medium by any known means, such a filtration, and preferably dried under a stream of inert gas.

The invention will be further described in connection with the following examples which are set forth for purposes of illustration only.

EXAMPLE 1 (COMPARATIVE)

350 ml of 1,4-dioxane are introduced into a cylindrical reactor with a double jacket equipped with a blade agitator and a fritted plate at its lower part. At a rate of 40 ml/h, 20 ml of a solution saturated at ambient temperature with anhydrous magnesium chloride in methanol are injected into the reactor. Agitation is kept at 500 RPM. At the end of the injection, filtration is carried out and the precipitated white solid obtained is washed with a saturated hydrocarbon. The solid is dried under a stream of nitrogen at 70° C. 6.4 g of powdered solid are recovered, composed of particles without definite shape and having diameters between 10 and 200 microns. FIG. 1 is a copy of a picture of the particles magnified 80 times.

EXAMPLE 2

Figure 2:
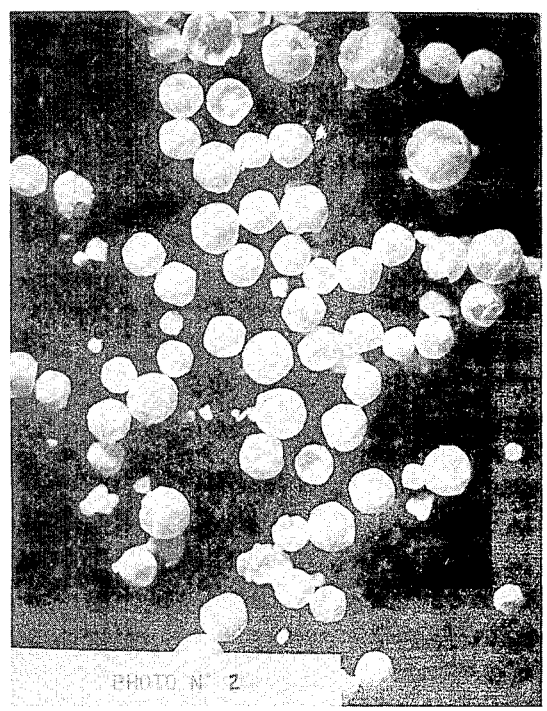
FIG. 2 is a copy of a photomicrograph of the spherical balls (magnified 10 times) formed by the process of Example 2.

Into a cylindrical reactor of 1 liter capacity, one introduces, 1,4-dioxane, heptane and silicone oil ("FLUID 710" of Rhone-Poulenc) at a proportion, respectively, of 15.2 and 3 parts by volume. At a rate of 2 ml/h, one injects into this mixture 13 ml of a solution saturated at ambient temperature with magnesium chloride in methanol. Agitation is fixed at 250 RPM. After filtration, washing, then drying under a stream of nitrogen at 70° C., 4.5 g of precipitated solid are recovered in the form of small spherical balls of a mean diameter of 850 microns. FIG. 2 is a picture of such balls magnified 10 times.

EXAMPLE 3

Figure 3:
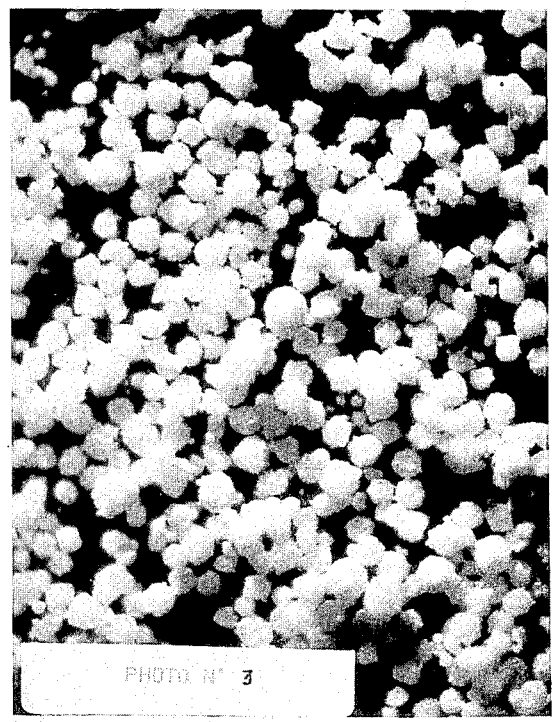
FIG. 3 is a copy of a photomicrograph of the spherical particles (magnified 50 times) formed by the process of Example 3.

Into a reactor identical to the one used in Example 1, one successively introduces 1,4-dioxane, acetone, heptane, and methylene chloride in proportions by volume of 4, 3, 2 and 2. 6 ml of a saturated solution of magnesium chloride in water are injected at a rate of 30 ml/h under agitation of 500 PPM. After filtration, washing and drying, one recovers 7.2 g of spherical particles of diameters between 100 and 250 microns. FIG. 3 is a picture of such particles magnified 50 times.

EXAMPLE 4

Figure 4:
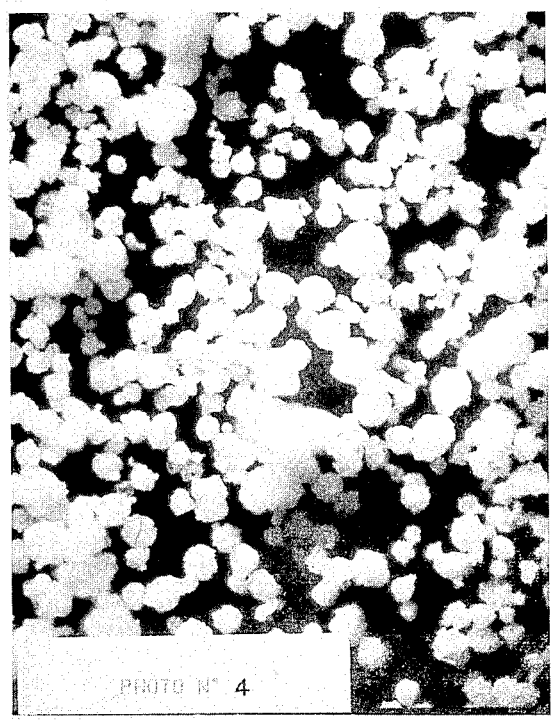
FIG. 4 is a copy of a photomicrograph of the spherical particles (magnified 80 times) formed by the process of Example 4.

The operating conditions of Example 1 are used, but the non-solvent medium is composed of 1,4-dioxane, heptane and methylene chloride in respective proportions by volume of 5, 1, and 3. The magnesium chloride in solution in water is injected at a rate of 10 ml/h. The precipitation solid is recovered in the same manner as in Example 3. The particles obtained are spherical with a mean diameter of about 100 microns. FIG. 4 is a picture of such particles magnified 80 times.

EXAMPLE 5

Figure 5:
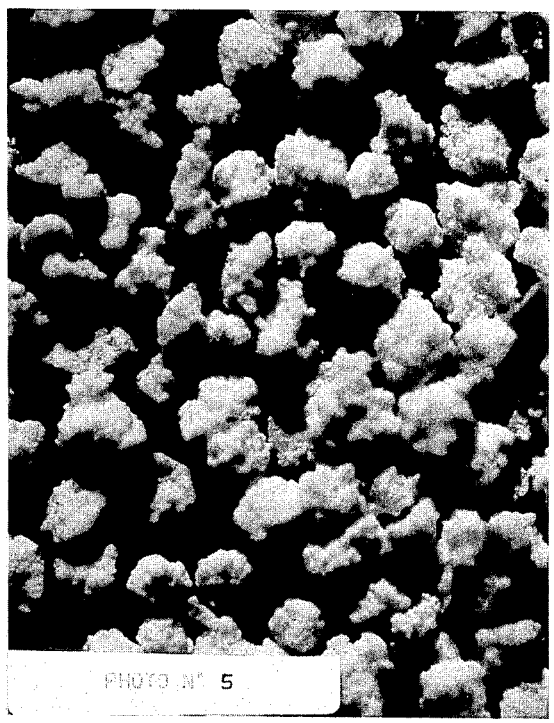
FIG. 5 is a copy of a photomicrograph of the spherical particles (magnified 80 times) formed by the process of Example 5.

The operating conditions of Example 1 are used with a non-solvent medium composed of 1,4-dioxane and methylene chloride in a ratio by volume equal to 3. The aqueous solution injected is prepared from a saturated solution in water of magnesium chloride and from another of calcium chloride so that the final ratio $MgCl_2/CaCl_2$ is equal to 9. After precipitation, filtration and washing, spherical particles are obtained whose mean diameter is between 150 and 250 microns. FIG. 5 is a picture of such particles magnified 80 times.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A process for the manufacture of substantially spherical particles of at least one metal compound of Group II of the Periodic Table, comprising dissolving such compound in a solvent therefor to form a solution and introducing the solution into a non-solvent medium to precipitate said dissolved metal compound as substantially spherical particles; said non-solvent medium consisting essentially of at least two liquids that are non-solvents for said compound, at least one of said non-solvents being immiscible with the solvent solution and at least one of said nonsolvents, and recovering said substantially spherical particles from said non-solvent medium being miscible with said solvent solution.

2. The process of claim 1, wherein the metal compound has the general formula:

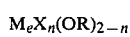

in which:

$M_e$ is a metal selected from Group II of the Periodic Table;

X is a halogen;

R is hydrogen or a hydrocarbon radical; and $0 < n < 2$.

3. The process of any one of claims 1 or 2, wherein the solvent is selected from water, methanol, ethanol, dimethylformamide, or mixtures thereof.

4. The process of any one of claims 1 or 2, wherein the volume of ratio of the miscible liquid to the immiscible liquid of the non-solvent medium is between 0.1 and 200.

5. A process for the manufacture of substantially spherical particles of at least one metal compound selected from magnesium chloride or calcium chloride, comprising dissolving such compound in a solvent therefor to form a solution and introducing the solution into a non-solvent medium to precipitate said dissolved metal compound as substantially spherical particles; said non-solvent medium consisting essentially of at least two liquids that are non-solvents for said compound, at least one of said nonsolvents being immiscible with the solvent solution and at least one of said non-solvents being miscible with said solvent solution.

6. A process for the manufacture of substantially spherical particles of at least one metal compound of Group II of the Periodic Table, comprising dissolving such compound in water to form a solution and introducing the solution into a non-solvent medium to precipitate said dissolved metal compound as substantially spherical particles; said non-solvent medium consisting essentially of at least two liquids that are non-solvents for said compound selected from a mixture of dioxane or of acetone with a hydrocarbon or methylene chloride, at least one of said non-solvents being immiscible with the solvent solution and at least one of said non-solvents being miscible with said solvent solution.

7. A process for the manufacture of substantially spherical particles of at least one metal compound of Group II of the Periodic Table, comprising dissolving such compound in a solvent selected from methanol or dimethyl formamide to form a solution and introducing the solution into a non-solvent medium to precipitate said dissolved metal compound as substantially spherical particles; said non-solvent medium consisting essentially of at least two liquids that are non-solvents for said compound selected from a mixture of dioxane or of methylene chloride with a hydrocarbon, at least one of said non-solvents being immiscible with the solvent solution and at least one of said non-solvents being miscible with said solvent solution.

* * * * *

UNITED STATES PATENT AND TRADEMARK OFFICE
CERTIFICATE OF CORRECTION

PATENT NO.  : 4,851,208
DATED       : July 25, 1989
INVENTOR(S) : DURANEL, et al It is certified that error appears in the above-identified patent and that said Letters Patent is hereby corrected as shown below:

Column 3, line 62 correct "15.2" to read -- 15,2 --;

Column 4, line 55 correct "nonsolvents" to read -- non-solvents --;

Column 4, lines 55 through 57 delete the phrase ", and recovering said substantially spherical particles from said non-solvent medium";

Column 4, line 57, after the word "solution" insert the phrase -- , and recovering said substantially spherical particles from said non-solvent medium --;

Column 5, line 16, correct "nonsolvents" to read -- non-solvents --.

Signed and Sealed this

Nineteenth Day of June, 1990

*Attest:*

HARRY F. MANBECK, JR.

*Attesting Officer*   *Commissioner of Patents and Trademarks*